United States Patent
Kanehara

[19]

[11] Patent Number: 6,143,397
[45] Date of Patent: Nov. 7, 2000

[54] OPENING TRIM AND MOLDING METHOD

[75] Inventor: Osamu Kanehara, Oobu, Japan

[73] Assignee: Tokai Kogyo Kabushiki Kaisha, Oobu, Japan

[21] Appl. No.: 08/992,177

[22] Filed: Dec. 17, 1997

[30] Foreign Application Priority Data

Dec. 26, 1996 [JP] Japan .................................. 8-358502

[51] Int. Cl.$^7$ .................................................. B32B 23/02
[52] U.S. Cl. ......................... 428/192; 428/31; 428/122; 428/542.8; 52/211
[58] Field of Search ...................... 52/211, 212; 49/504, 49/181; 264/146, 167, 177.16; 428/524.8, 31, 122, 215, 217, 99, 516, 519, 192

[56] References Cited

U.S. PATENT DOCUMENTS

| | | | |
|---|---|---|---|
| 3,774,363 | 11/1973 | Kent ........................................... | 52/400 |
| 4,494,337 | 1/1985 | Watanabe et al. .......................... | 49/374 |
| 4,631,865 | 12/1986 | Motonami et al. ......................... | 49/374 |
| 5,527,583 | 6/1996 | Nozaki et al. .............................. | 428/99 |
| 5,972,268 | 10/1999 | Nakajima et al. ......................... | 264/138 |

FOREIGN PATENT DOCUMENTS 58-170648 10/1998 Japan .
60-169349 10/1998 Japan .

*Primary Examiner*—Deborah Jones
*Assistant Examiner*—Abraham Bahta
*Attorney, Agent, or Firm*—Oblon, Spivak, McClelland, Maier & Neustadt, P.C.

[57] ABSTRACT

An opening trim including a body approximately U-shaped in section, a right-hand projection and a left-hand projection which are opposed to each other in a space surrounded with the body and mounted on an installing portion such as a flange. Each of the right-hand holding projection and the left-hand holding projection has a primary lip projecting rearward from a front portion of an inner side surface of the body, respectively. The right-hand holding projection and/or the left-hand holding projection have a secondary lip projecting inward from a rear portion of one and/or the other inner side surface of the body. Each of the secondary lips has an engaging concave temporarily engaging a leading end of each of the primary lips.

10 Claims, 9 Drawing Sheets

PRIOR ART

OPENING TRIM AND MOLDING METHOD

BACKGROUND OF THE INVENTION

1. Field of the Invention

The present invention relates to the construction of an opening trim installed on an installing portion such as a flange of an open part of a vehicle body.

2. Description of the Related Arts

Figure 12:
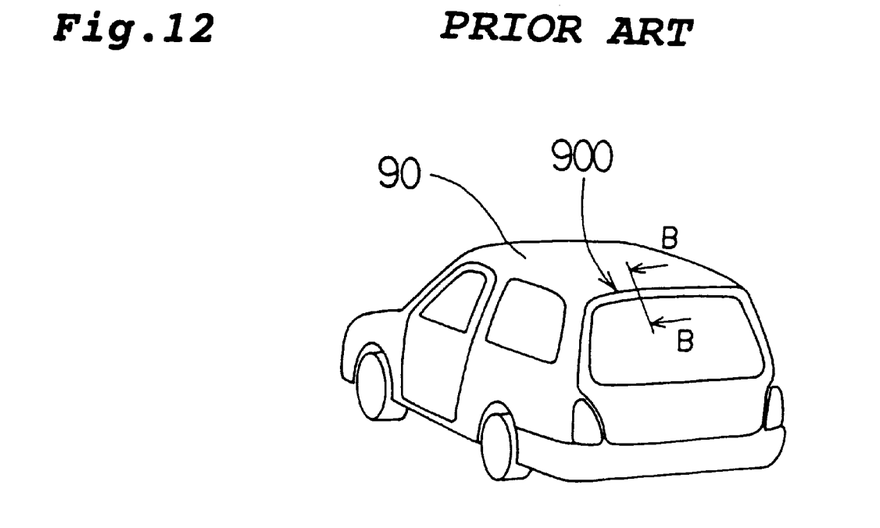
FIG. 12 is a perspective view showing a vehicle body on which a conventional opening trim is installed.
Figure 13:
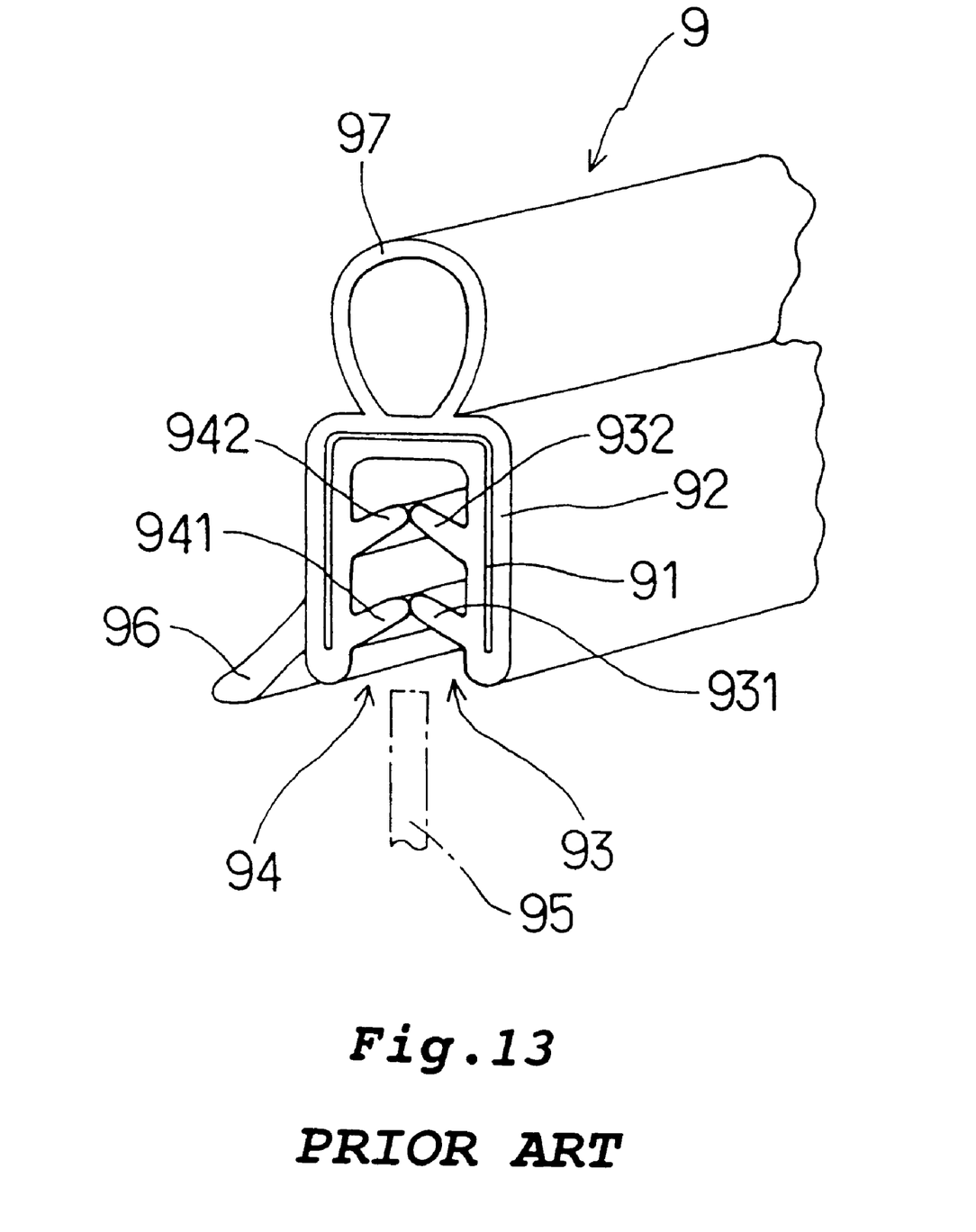
FIG. 13 is a perspective view showing the conventional opening trim to be installed on the vehicle body at a portion thereof shown by a line B—B of FIG. 12.

Referring to FIGS. 12 and 13, an opening trim 9 is mounted on a projected installing portion such as a flange of an open part 900 of a vehicle body 90.

Referring to FIG. 13, the opening trim 9 has a sectionally U-shaped body 92 accommodating a core 91; and right-hand and left-hand holding projections 93 and 94 which are opposed to each other in the space surrounded with the body 92 and installed on the installing portion, with the right-hand and left-hand holding projections 93 and 94 sandwiching the installing portion therebetween.

The right-hand and left-hand holding projections 93 and 94 have primary lips 931 and 941 projecting inward from the inner side of the body 92 at a front portion thereof, respectively; and secondary lips 932 and 942 projecting inward from the inner of the body 92 at a rear portion thereof, respectively, as disclosed in Japanese Laid-Open patent publications Nos. 58-170648 and 60-169349. The core 91 is made of metal. The body 92 and the right-hand and left-hand holding projections 93 and 94 are made of synthetic resin or rubber.

As shown in FIG. 13, the opening trim 9 is installed on an installing portion 95 by inserting the installing portion 95 between the right-hand and left-hand holding projections 93 and 94. After the opening trim 9 is installed thereon, the installing portion 95 is sandwiched firmly between the right-hand and left-hand holding projections 93 and 94 to prevent the opening trim 9 from being removed from the installing portion 95. The opening trim 9 further comprises an outer lip 96 and a sealing portion 97.

However, the conventional opening 9 trim has problems described below.

That is, as described above, because the installing portion 95 is required to be sandwiched firmly between the right-hand and left-hand holding projections 93 and 94, a great force acts in the direction in which the right-hand and left-hand holding projections 93 and 94 are closed. Therefore, in inserting the installing portion 95 between the right-hand and left-hand holding projections 93 and 94, a great resistance is generated owing to the friction caused by the contact between the right-hand and left-hand holding projections 93 and 94 and the installing portion 95. Thus, a large force is required in inserting the installing portion 95 between the right-hand and left-hand holding projections 93 and 94.

Thus, the opening trim 9 is installed on the installing portion of the vehicle body inefficiently. If the force acting in the direction in which the right-hand and left-hand holding projections 93 and 94 are closed is set to be small, there is a possibility that the opening trim 9 is removed from the installing portion of the vehicle body.

SUMMARY OF THE INVENTION

It is an object of the present invention to provide an opening trim which can be easily installed on an installing portion and held thereon securely; and a method of molding a material into the opening trim.

An opening trim of the present invention includes a body approximately U-shaped in section, and a right-hand holding projection and a left-hand holding projection which are opposed to each other in a space surrounded with the body and mounted on an installing portion such as a flange. Each of the right-hand holding projection and the left-hand holding projection has a primary lip projecting rearward from a front portion of an inner side surface of the body, respectively. The right-hand holding projection and/or the left-hand holding projection have a secondary lip projecting inward from a rear portion of one and/or the other inner side surface of the body. Each of the secondary lips has an engaging concave temporarily engaging a leading end of each of the primary lips.

The most outstanding feature of the present invention is that each of the right-hand holding projection and the left-hand holding projection has the primary lip, respectively; the right-hand holding projection and/or the left-hand holding projection have the secondary lip; and each of the secondary lips has the engaging concave temporarily engaging the leading end of each of the primary lips.

The operation and effect of the present invention are described below.

Figure 1:
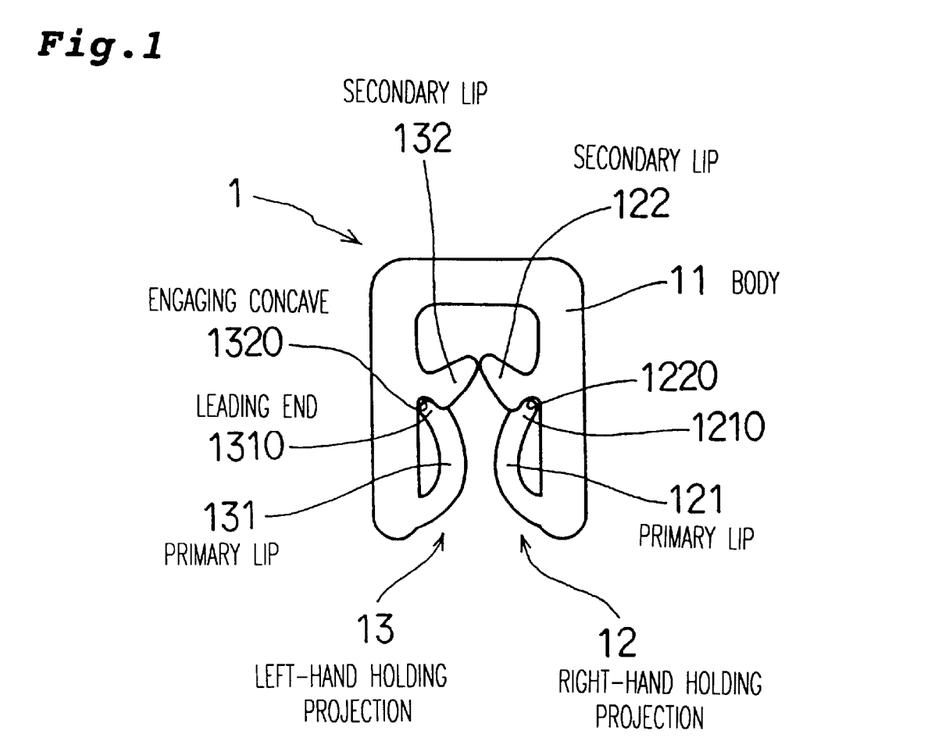
FIG. 1 is a sectional view showing an opening trim of an embodiment 1 before it is installed on an installing portion.
Figure 2:
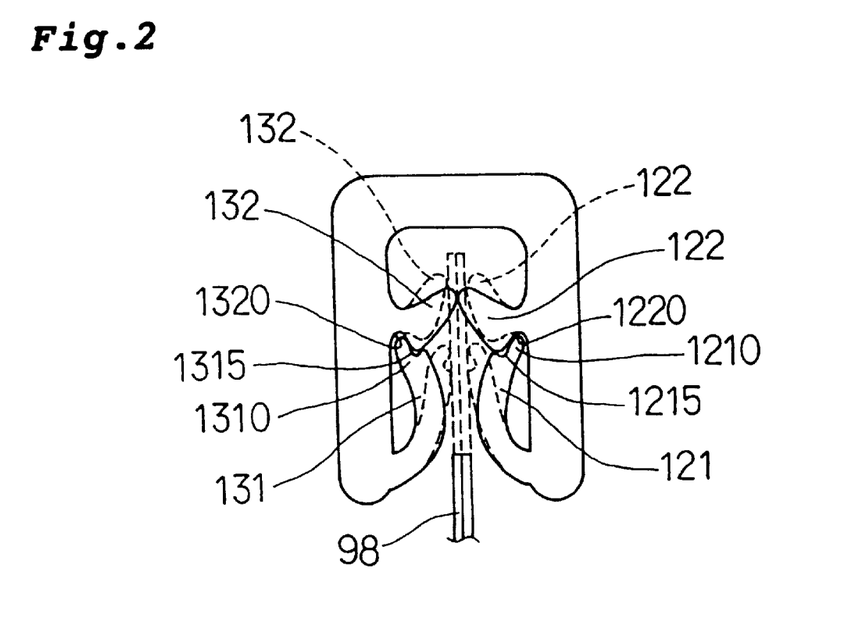
FIG. 2 is an explanatory view showing the opening trim of the embodiment 1 when it is installed on the installing portion.

As shown in FIGS. 1 and 2, until the opening trim is installed on the installing portion, the leading end of the primary lip positioned at the secondary lip-provided side engages the engaging concave of the secondary lip temporarily. Thus, the primary lip is bent in the shape of "C" in section. Therefore, in inserting the installing portion into the space surrounded with the body of the opening trim, there is a slight gap between the installing portion and the primary lip or the installing portion contacts it slightly. Consequently, in inserting the installing portion into the space surrounded with the body, no resistance is generated owing to the friction caused by the contact between the primary lip and the installing portion. Therefore, the degree of the resistance generated in inserting the installing portion between the right-hand and left-hand holding projections is about half of the degree of the resistance generated in inserting the installing portion between the right-hand and left-hand holding projections of the conventional opening trim. Accordingly, the opening trim of the present invention can be installed on the installing portion efficiently.

Further, in inserting the installing portion between the right-hand and left-hand holding projections, the leading end of the installing portion presses the leading end of each of the secondary lips rearward. Consequently, the leading end of each of the primary lips disengages from the engaging concave of each of the secondary lips. As a result, the primary lips contact the side surface of the installing portion.

Therefore, the installing portion 98 can be sandwiched firmly between both primary lips and by at least one of the secondary lips.

This and other objects, features, and advantages of the present invention will become more apparent upon reading of the following detailed description and drawings.

DETAILED DESCRIPTION OF THE INVENTION

Preferably, each of the engaging concaves is formed at a base of each of the secondary lips; and the leading end of each of the primary lips has a stepped portion temporarily engaging each of the engaging concaves. In this case, as shown in FIG. 1, the leading end of the primary lip is bent to locate the leading end thereof at the base of the secondary lip. Therefore, in inserting the installing portion into the space surrounded with the body of the opening trim, no resistance or a small resistance is generated owing to the friction caused by the contact between the side surface of the right-hand and left-hand holding projections and the installing portion. Thus, the opening trim can be installed on the installing portion of a vehicle body or the like efficiently.

Preferably, the primary lips are bent in the shape of "C" in section; and each of the primary lips engages the engaging concave of each of the secondary lips temporarily. Thus, the installing portion such as a flange can be inserted easily into the space surrounded with the body of the opening trim.

Preferably, a gap is provided between the primary lip of the right-hand holding projection and that of the left-hand holding projection. In this case, the installing portion such as a flange can be inserted easily into the space surrounded with the body of the opening trim.

A method of forming an opening trim comprising a body approximately U-shaped in section and accommodating a core; and a right-hand holding projection and a left-hand holding projection which are opposed to each other in a space surrounded with the body and mounted on an installing portion such as a flange, wherein each of the right-hand holding projection and the left-hand holding projection has a primary lip projecting rearward from a front portion of an inner side surface of the body, respectively; and the right-hand holding projection and/or the left-hand holding projection have a secondary lip projecting inward from a rear portion of one and/or the other inner side surface of the body; and each of the secondary lips has an engaging concave temporarily engaging a leading end of each of the primary lips. The method comprising the steps of:

forming a flat material comprising the body and the right-hand and left-hand holding projections projecting therefrom by molding the flat material on a surface of a flat core;

performing a primary bending operation of bending the flat material inward so that the right-hand holding projection confront the left-hand holding projection; and performing a secondary bending operation of bending the body to form the body into a predetermined shape in section and engaging the leading end of each of the primary lips with the engaging concave of each of the secondary lips temporarily.

The method allows the opening trim to be easily manufactured.

The secondary bending operation is carried out by using a pair of side rollers bending both outer side surfaces of the body to form the body into the predetermined shape in section; and a lip-pressing roller positioned in the space surrounded with the body to temporarily engage the leading end of each of the primary lips with the engaging concave of each of the secondary lips.

In this case, the body of the opening trim can be easily bent to form it into the shape of "U" in section; and using the lip-pressing roller, the leading end of each of the primary lips can be easily engaged by the engaging concave of each of the secondary lips.

EMBODIMENTS

Embodiment 1

The opening trim and the method of molding a material into the opening trim according to the embodiment 1 will be described below with reference to FIGS. 1 through 3.

As shown in FIGS. 1 and 2, the opening trim 1 has a sectionally U-shaped body 11; and right-hand and left-hand holding projections 12 and 13 which are opposed to each other in the space surrounded with the body 11 and mounted on an installing portion 98 such as a flange.

The right-hand holding projection 12 and the left-hand holding projection 13 have primary lips 121 and 131 making a pair and projecting rearward from a front portion of the inner side surface of the body 11, respectively; and secondary lips 122 and 132 projecting inward from rear portions of the inner side surface of the body 11, respectively.

The secondary lips 122 and 132 has engaging concaves 1220 and 1320, respectively which temporarily engage the leading end 1210 of the primary lip 112 and the leading end 1310 of the primary lip 131, respectively.

The engaging concaves 220 and 320 are formed at the base of each of the secondary lips 122 and 132. The leading ends 1210 and 1310 of each of the primary lips 121 and 131 have stepped portions 1215 and 1315 temporarily engaging the engaging concaves 1220 and 1320, respectively.

Figure 4:
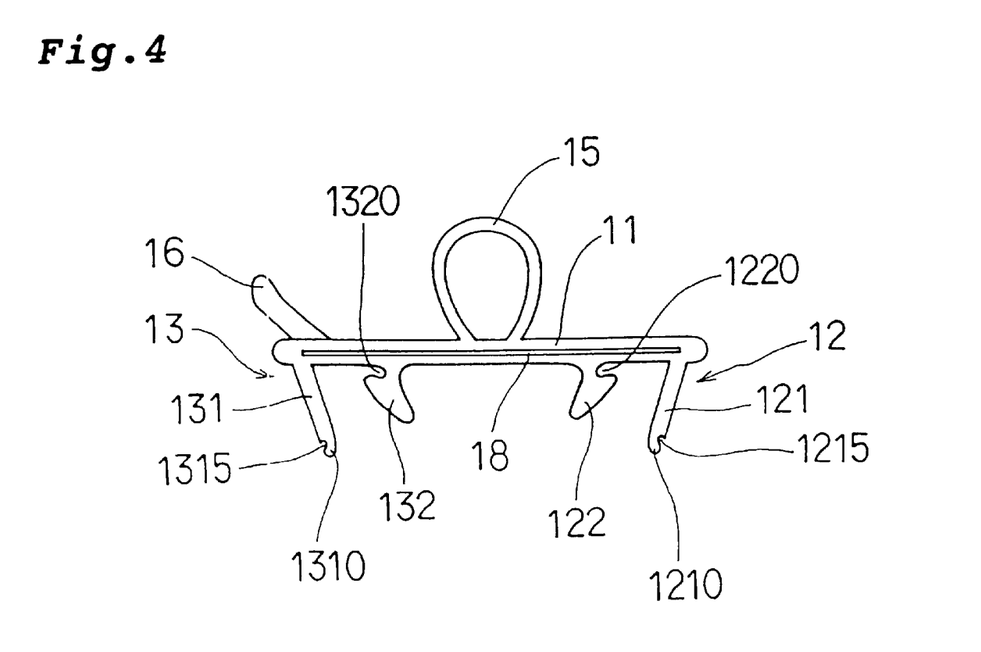
FIG. 4 is a sectional view showing a flat molded material of an opening trim according to an embodiment 2.
Figure 5:
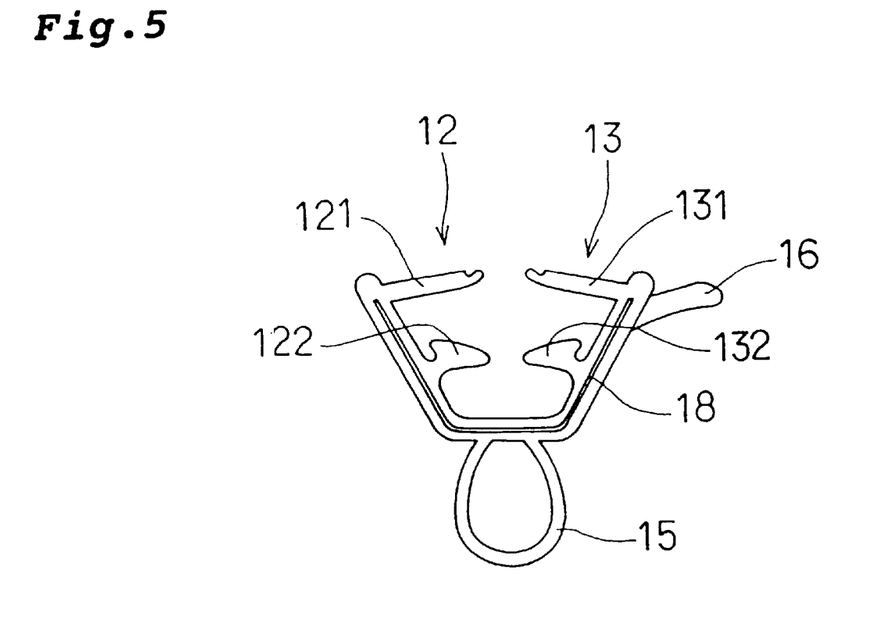
FIG. 5 is a sectional view showing the opening trim bent in a primary bending operation performed by a molding method according to the embodiment 2.
Figure 6:
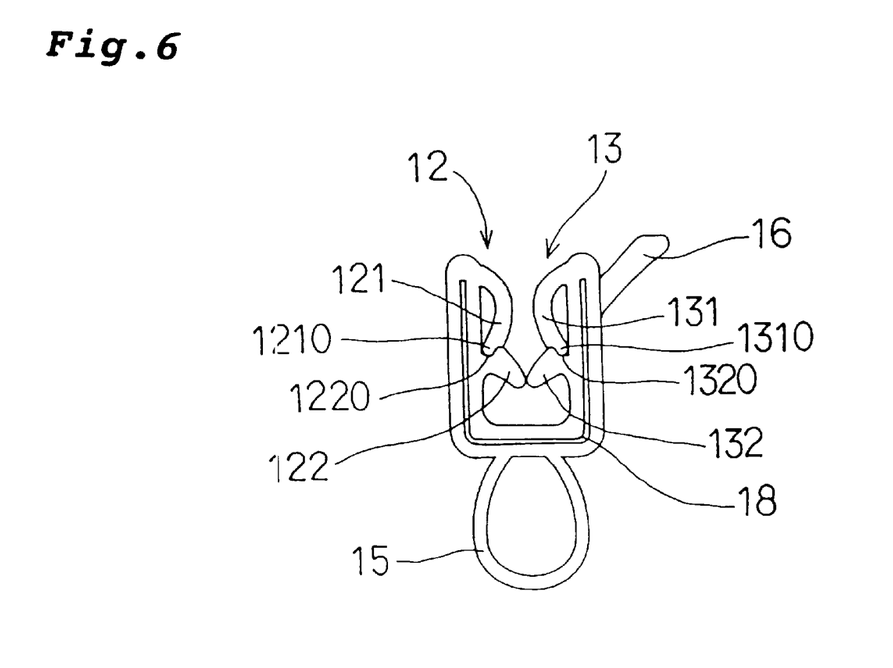
FIG. 6 is a sectional view showing the opening trim bent in a secondary bending operation performed by the molding method according to the embodiment 2.

The body 11 has an annular sealing portion 15 and an outer sealing lip 16 projecting from a side surface thereof (see FIGS. 4, 5, and 6).

The body 11, the primary lips 121 and 131, and the secondary lips 122 and 132 are made of hard or soft rubber as a kind of EPDM (ethylene-propylene-diene terpolymer). The opening trim is formed by molding a material by extrusion, primary bending operation, and secondary bending operation, as will be described in the second embodiment.

The operation and effect of the present invention are described below.

Until the opening trim 1 is installed on the installing portion 98, the leading ends 1201 and 1301 of each of the primary lips 121 and 131 engage the engaging concaves 1220 and 1320 of each of the secondary lips 122 and 132 temporarily, respectively; and thus the primary lips 121 and 131 are bent in the shape of "C" in section.

As shown in FIG. 1, a gap is provided between the primary lips 121 and 131.

In inserting the installing portion 98 into the space surrounded with the body 11, there is a slight gap between the installing portion 98 and the primary lip 121 as well as the primary lip 131 or the installing portion 98 contacts them slightly. Consequently, in inserting the installing portion 98 into the space surrounded with the body 11, no resistance is generated owing to the friction caused by the contact between the primary lip 121 as well as the primary lip 131 and the installing portion 98.

Therefore, the degree of the resistance generated in inserting the installing portion 98 between the right-hand and left-hand holding projections 12 and 13 is about half of the degree of the resistance generated in inserting the installing portion 95 between the right-hand and left-hand holding projections of the conventional opening trim (see FIG. 13). Accordingly, the opening trim can be installed on the installing portion 98 efficiently.

Figure 3:
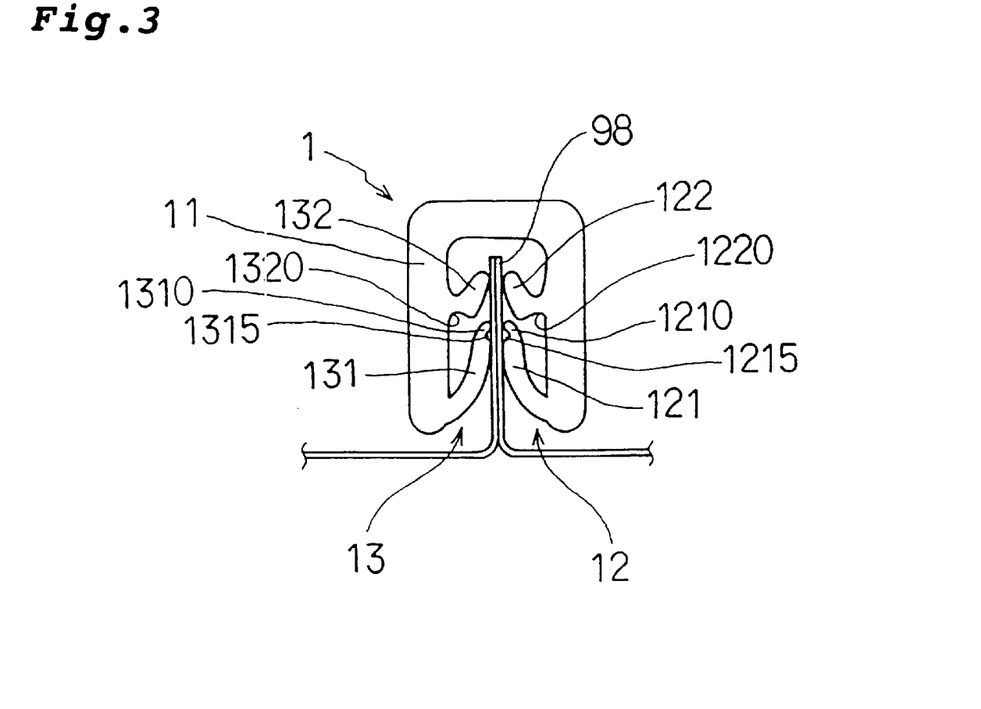
FIG. 3 is a sectional view showing the opening trim of the embodiment 1 when it has been installed on the installing portion.

Referring to FIGS. 2 and 3, in inserting the installing portion 98 between the right-hand and left-hand holding projections 12 and 13, the leading end of the installing portion 98 presses the leading end of each of the secondary lips 122 and 132 rearward. Consequently, the leading ends 1210 and 1310 of each of the primary lips 121 and 131 disengage from the engaging concaves 1220 and 1320 of each of these secondary lips 122 and 132. As a result, the primary lips 121 and 131 contact the side surface of the installing portion 98.

Therefore, the installing portion 98 can be sandwiched firmly between the primary lips 121 and 131 and between the secondary lips 122 and 132.

Referring to FIGS. 2 and 3, as described previously, the primary lips 121 and 131 have the engaging stepped portions 1215 and 1315, respectively formed at each of the leading ends 1210 and 1310 thereof. Thus, until the installing portion 98 is inserted into the opening trim, the primary lips 121 and 131 can securely be temporarily engaged by each of the secondary lips 122 and 132.

A core may be provided inside the body 11 of the opening trim 1, as will be described in the embodiment 2.

Embodiment 2

As shown in FIGS. 4 through 10, the embodiment 2 relates to the method of forming the opening trim 1 described in the embodiment 1 by molding a material.

Referring to FIGS. 4 and 6, the opening trim has a flat core 18 inside the body thereof, an annular sealing portion 15, and an outer lip 6 projecting outward from the body 11.

Referring to FIGS. 4 and 6, the method of forming the opening trim 1 by molding the material is described below. First, a flat material 10 (see FIG. 4) of the opening trim 1 comprising the body 11 and the right-hand and left-hand holding projections 12 and 13 projecting therefrom is formed by molding the flat material on the surface of the flat core 18. Then, as shown in FIG. 5, a primary bending operation is performed by means of a primary bending machine 2. That is, the flat material 10 is bent inward so that the right-hand holding projection 12 confronts the left-hand holding projection 13. The core 18 consists of cold-rolled steel or a wire carrier.

Then, as shown in FIG. 6, a secondary bending machine 3 is used to perform a secondary bending operation, namely, to bend the body 11 to form the body 11 into the predetermined shape, namely, "U" in section and that the leading ends 1210 and 1310 of each of the primary lips 121 and 131 engage the engaging concaves 1220 and 1320 of each of the secondary lips 122 and 132 temporarily.

Figure 7:
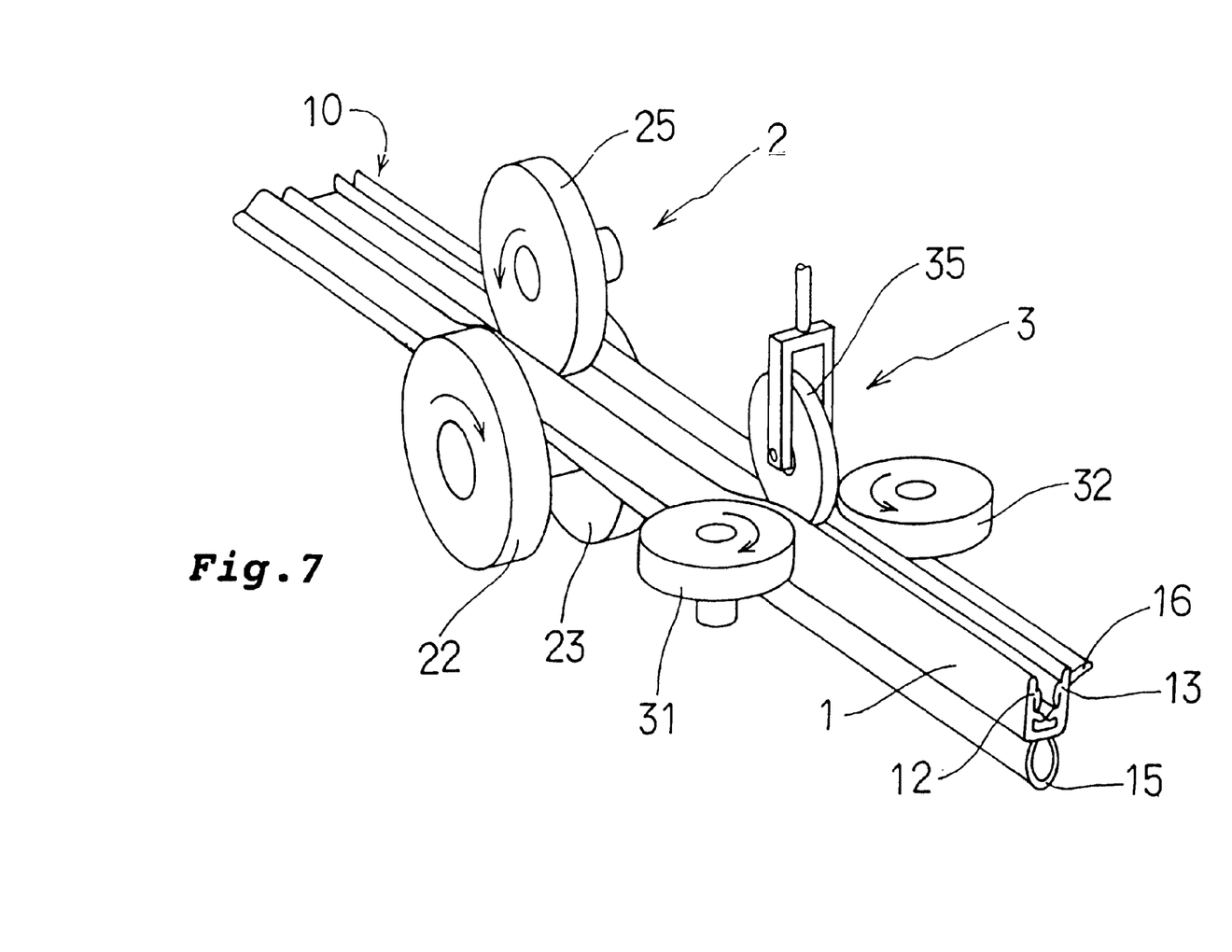
FIG. 7 is a perspective view showing primary and secondary bending machines according to the embodiment 2.
Figure 8:
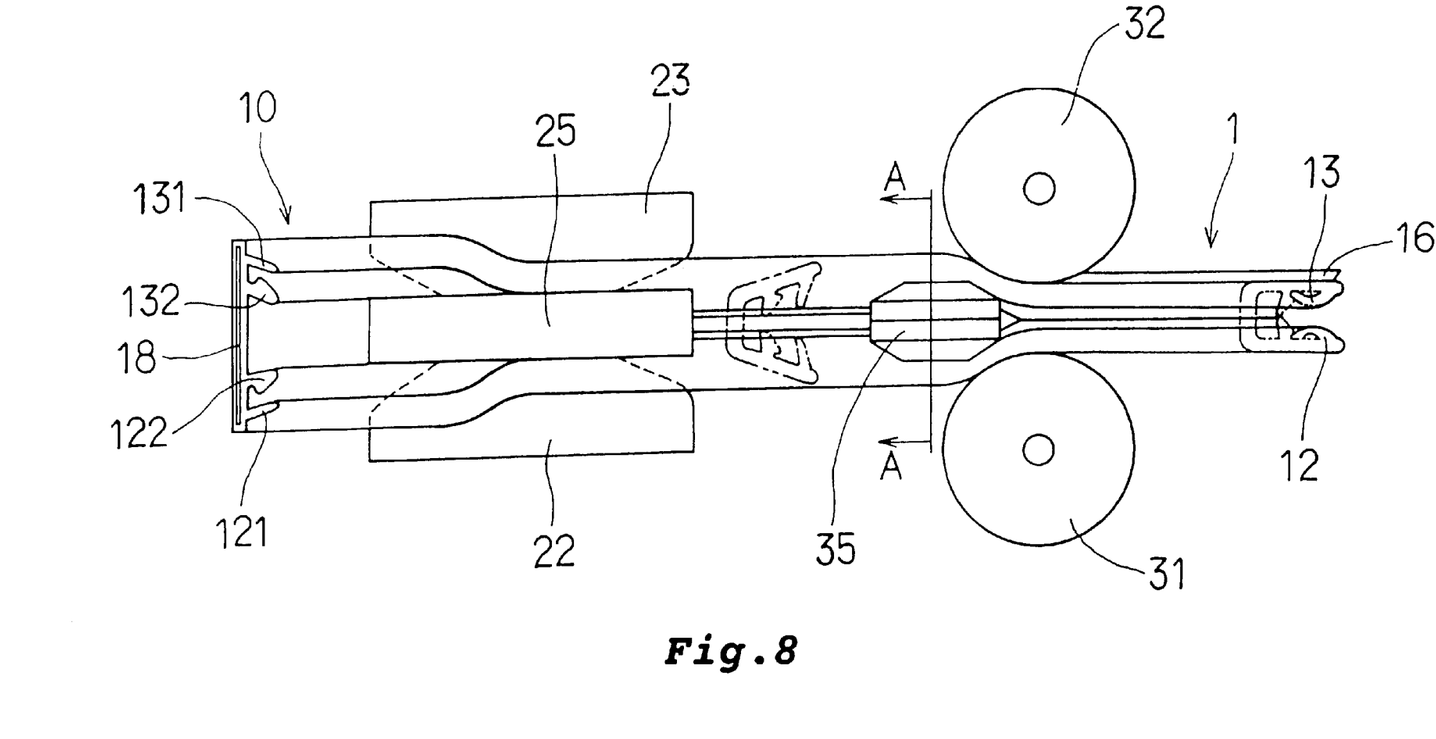
FIG. 8 is a plan view showing primary and secondary bending machines according to the embodiment 2.

As shown in FIGS. 7 and 8, the primary bending operation is performed by using an upper roller 25 positioned in the space surrounded with the body 11; and a pair of lower rollers 22 and 23 positioned at both sides of the upper roller 25 to bend the body 11 in the shape of "U" such that the distance between the right-hand and left-hand holding projections 12 and 13 at the front side (upper part in FIG. 5) is greater than that there between at the rear side (lower part in FIG. 5).

Figure 9:
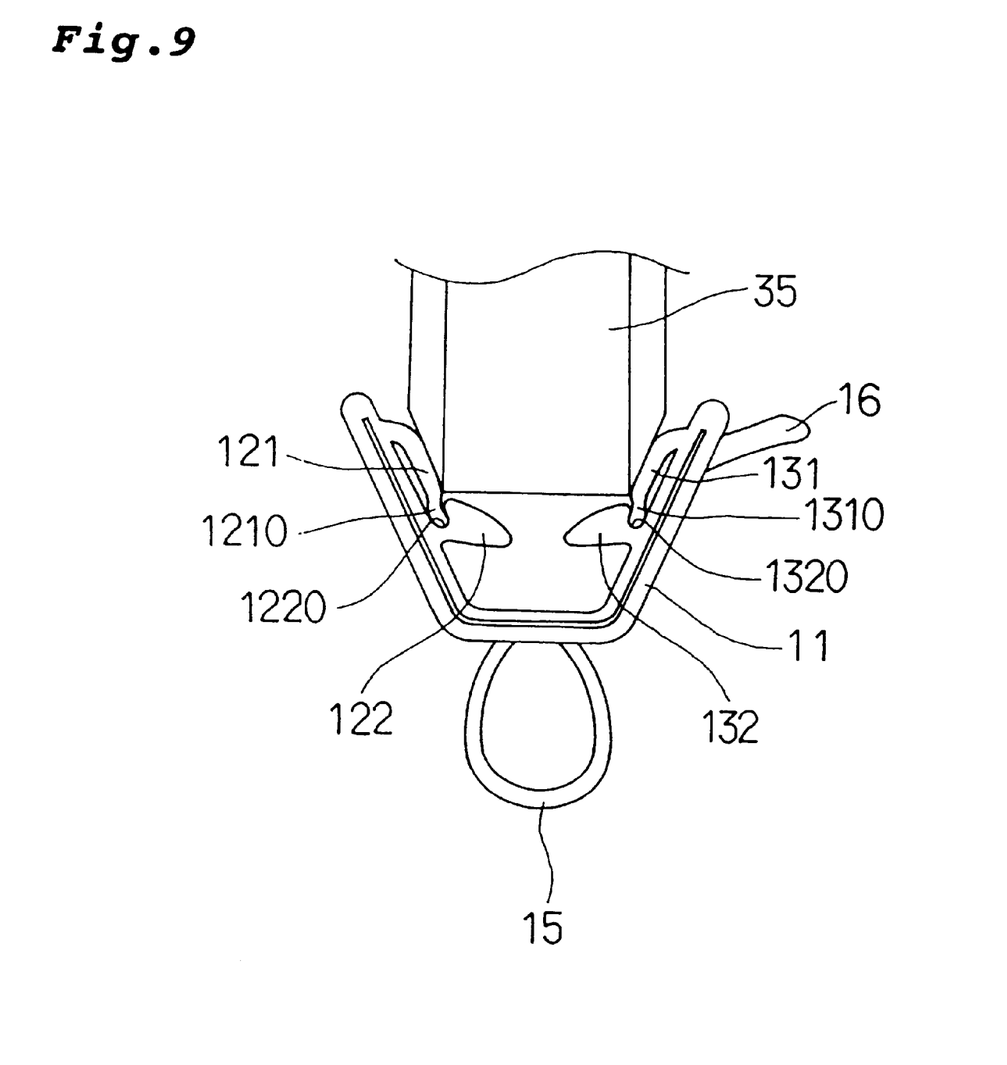
FIG. 9 is an explanatory sectional view taken along a line A—A of FIG. 8 and showing a state in which the opening trim is being bent in the secondary bending operation performed by the molding method according to the embodiment 2.

Referring to FIGS. 7 through 9, the secondary bending operation is carried out by using a pair of side rollers 31 and 32 bending both outer side surfaces of the 11 body to form the body 11 into the predetermined shape of "U"in section; and a lip-pressing roller 35 positioned between the side rollers 31 and 32 and in the space surrounded with the body 11 to temporarily engage the leading ends 1210 and 1310 of each of the primary lips 121 and 131 with the engaging concaves 1220 and 1320 of each of the secondary lips 122 and 132.

Figure 10:
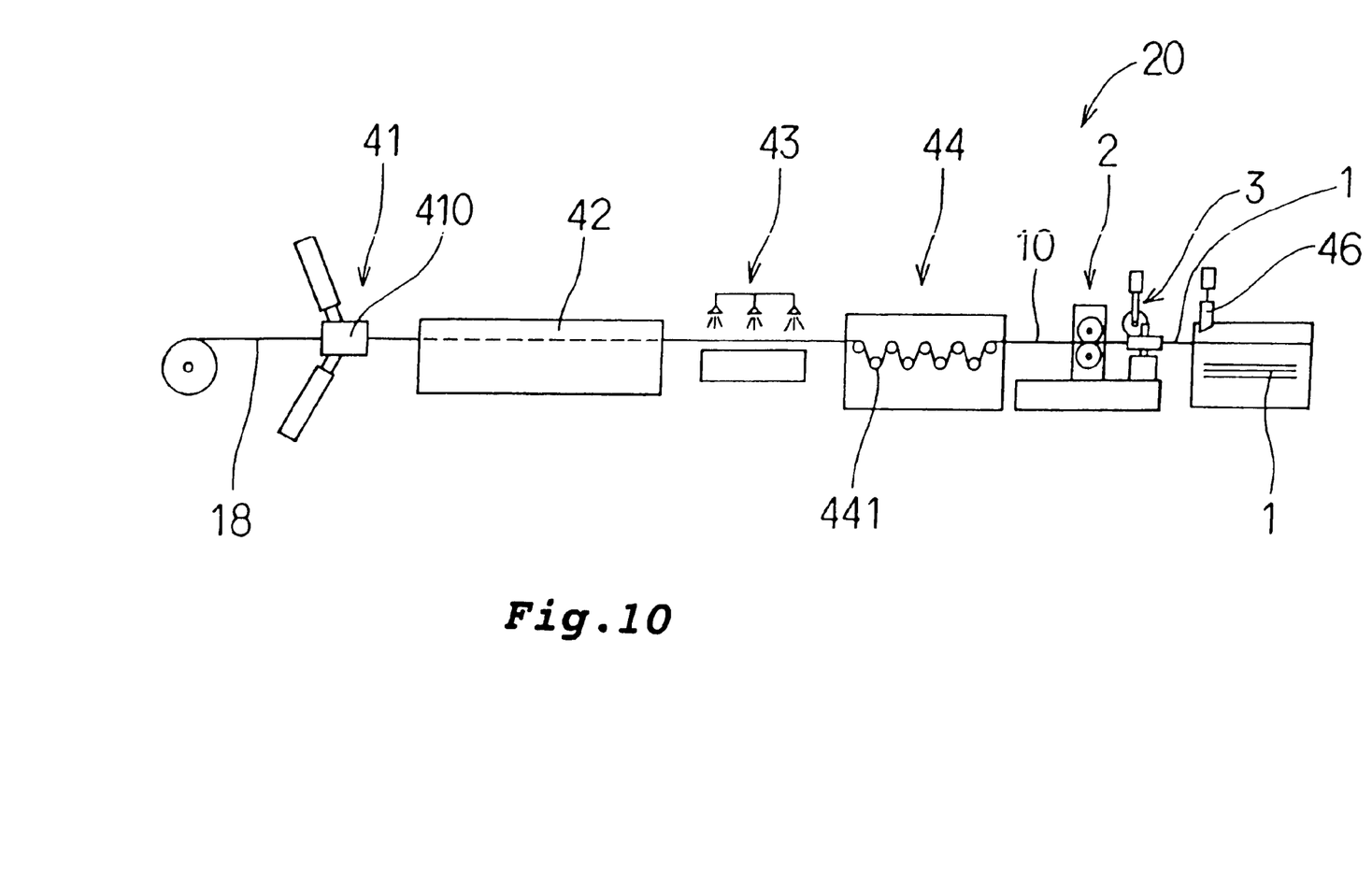
FIG. 10 is an explanatory view showing the process of manufacturing the opening trim by the molding method according to the embodiment 2.

The process of manufacturing the opening trim is described below with reference to FIG. 10. Initially, unvulcanized rubber as a kind of EPDM is extruded onto the core 18 from a mouth 410 of an extruder 41 to mold the unvulcanized rubber into the body 11, the primary lips 121 and 131, and the secondary lips 122 and 132.

Then, the unvulcanized rubber is heated in a vulcanizing oven 42 to vulcanize and harden it. Then, it is cooled in a cooling tank 43, and the core 18 is cut to a plurality of pieces each having a predetermined length by a plurality of rollers 441 of a core-bending device 44.

Thereafter, as shown in FIGS. 7 through 9, using the rollers of the primary and secondary bending machines 2 and 3, the primary and secondary bending operations are performed to form the long opening trim 1. Then, using a cutting machine 46, the opening trim 1 having a desired length is obtained.

The molding method according to the embodiment 2 allows the opening trim having the construction described in the embodiment 1 to be easily formed by molding the unvulcanized rubber on the surface of the flat core 18. Further, because the primary and secondary bending operations are sequentially performed by using the rollers of the primary and secondary bending machines 2 and 3, the molding can be accomplished accurately and easily.

The second bending machine 3 bends the body 11 to form it into the predetermined shape and allows the primary lips 121 and 131 to be simultaneously and temporarily engaged by the engaging concave 1220 of the secondary lip 122 and the engaging concave 1320 of the secondary lip 132, respectively. Thus, the method of the embodiment 2 allows the opening trim 1 to be manufactured with a high productivity.

Further, because the sealing portion 15 is annular, the opening trim 1 is capable of securely sealing the gap between doors of a vehicle body and the opening trim 1.

Embodiment 3

Figure 11:
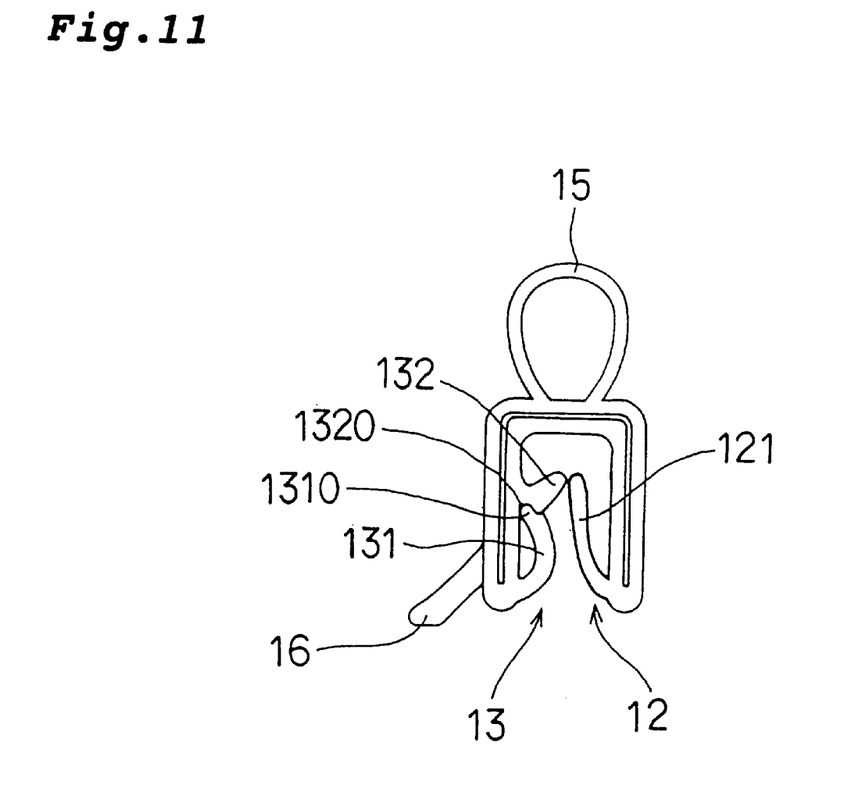
FIG. 11 is a sectional view showing an opening trim according to an embodiment 3.

In the embodiment 3, the left-hand holding projection 13 has the primary lip 131 and the secondary lip 132, as in the case of the left-hand holding projection 13 of the embodiment 1, whereas the right-hand holding projection 12 has the primary lip 121 but does not have the secondary lip, as shown in FIG. 11.

The leading end 1310 of the primary lip 131 of the left-hand holding projection 13 engages the engaging concave 1320 of the secondary lip 132 temporarily. The primary lip 121 of the right-hand holding projection 12 is formed longer than the primary lip 131 of the left-hand holding projection 13 such that the leading end of the primary lip 121 confronts the leading end of the secondary lip 132.

When an installing portion 98 is inserted into the opening trim 1, the leading end 1310 of the primary lip 131 disengages from the engaging concave 1320 of the secondary lip 132. As a result, the primary lip 131 and the secondary lip 132 contact one side surface of the installing portion 98, similarly to the embodiment 1; and the primary lip 121 contacts the other side surface of the installing portion 98. In this manner, the right-hand and left-hand holding projections 12 and 13 sandwich the installing portion 98 therebetween, thus holding it firmly.

The embodiment 3 has an operation and effect similar to that of the embodiment 1.

While the invention has been described with reference to embodiments, it is to be understood that modifications or variations may be easily made by a person of ordinary skill in the art without departing from the scope of the invention which is defined by the appended claims.

What is claimed is:

1. An opening trim comprising:
   a body approximately U-shaped in section;
   a right-hand holding projection and a left-hand holding projection which are opposed to each other in a space surrounded with the body and mounted on an installing portion,
   in which each of the right-hand holding projection and the left-hand holding projection has a primary lip projecting rearward from a front portion of an inner side surface of the body, respectively; and the right-hand holding projection and/or the left-hand holding projection have a secondary lip projecting inward from a rear portion of one and/or the other inner side surface of the body; and
   each of the secondary lips has an engaging concave temporarily engaging a leading end of each of the primary lips.

2. The opening trim according to claim 1, wherein each of the engaging concaves is formed at a base of each of the secondary lips; and the leading end of each of the primary lips has a stepped portion temporarily engaging each of the engaging concaves.

3. The opening trim according to claim 1, wherein the primary lips are bent in the shape of "C" in section; and each of the primary lips engages the engaging concave of each of the secondary lips temporarily.

4. The opening trim according to claim 3, wherein a gap is provided between the primary lip of the right-hand holding projection and that of the left-hand holding projection.

5. An opening trim comprising:
   a body having a generally inner recess with a generally U-shaped cross-section and an open end, said inner recess having a first side surface and a second side surface, said first side surface opposing said second side surface,
   wherein said first side surface includes a primary lip projecting within said inner recess in a direction away from said open end and a secondary lip projecting within said inner recess, said secondary lip having a concave portion temporarily engaging a leading end of said primary lip.

6. The opening trim according to claim 5, wherein said second side surface includes a primary lip projecting within said inner recess in a direction away from said open end and a secondary lip projecting within said inner recess, said secondary lip of the second side surface having a concave portion temporarily engaging a leading end of said primary lip of said second side surface.

7. The opening trim according to claim 6, wherein a gap is provided between said primary lip of said first side wall and said primary lip of said second side wall.

8. The opening trim according to claim 5, wherein said primary lip of said first side surface is located on a front portion of said first side surface adjacent to said open end and said secondary lip of said first side surface is located on a rear portion of said first side surface remote from said open end.

9. The opening trim according to claim 5, wherein said concave portion is formed at a base of said secondary lip, and said leading end of the primary lip has a stepped portion temporarily engaging said concave portion.

10. The opening trim according to claim 5, wherein said primary lip is bent in a C-shaped cross-section, and said primary lip engages said concave portion of said secondary lip temporarily.

* * * * *